(12) United States Patent
Zahdeh

(10) Patent No.: US 7,571,708 B2
(45) Date of Patent: Aug. 11, 2009

(54) SPARK IGNITED DIRECT INJECTION TARGETING FOR IMPROVED COMBUSTION

(75) Inventor: Akram R. Zahdeh, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/035,877

(22) Filed: Feb. 22, 2008

(65) Prior Publication Data

US 2009/0064963 A1 Mar. 12, 2009

Related U.S. Application Data

(60) Provisional application No. 60/971,119, filed on Sep. 10, 2007.

(51) Int. Cl.
*F02B 15/00* (2006.01)
(52) U.S. Cl. .................. 123/298; 123/295; 123/305
(58) Field of Classification Search .............. 123/295, 123/298, 305
See application file for complete search history.

(56) References Cited

U.S. PATENT DOCUMENTS

| | | | | |
|---|---|---|---|---|
| 5,058,549 A * | 10/1991 | Hashimoto et al. | .......... | 123/298 |
| 5,908,018 A * | 6/1999 | Suzuki | .......... | 123/301 |
| 6,532,933 B1 * | 3/2003 | Tanaka et al. | .......... | 123/305 |
| 6,715,463 B2 * | 4/2004 | Kudo et al. | .......... | 123/261 |
| 6,948,474 B2 * | 9/2005 | Yamaguchi et al. | .......... | 123/295 |
| 7,082,922 B2 * | 8/2006 | Abe et al. | .......... | 123/305 |
| 7,418,940 B1 * | 9/2008 | Yi et al. | .......... | 123/295 |
| 2001/0052339 A1 * | 12/2001 | Halleron et al. | .......... | 123/519 |
| 2004/0050359 A1 * | 3/2004 | Imoehl | .......... | 123/295 |
| 2004/0055560 A1 * | 3/2004 | Nakayama et al. | .......... | 123/298 |
| 2007/0113822 A1 * | 5/2007 | Kim et al. | .......... | 123/300 |

* cited by examiner

*Primary Examiner*—Erick Solis
(74) *Attorney, Agent, or Firm*—Harness, Dickey & Pierce, P.L.C.

(57) ABSTRACT

An engine assembly may include an engine block defining a cylinder bore, a piston disposed within the cylinder bore, and a spark ignited direct injection fuel system. The piston may be disposed within the cylinder bore and may be reciprocally displaceable from a first position to a second position during an intake stroke. The cylinder bore and the piston may partially define a combustion chamber. The spark ignited direct injection fuel system may include a fuel injector that provides a fuel flow to the combustion chamber during the intake stroke. The fuel flow may be directed toward an upper surface of the piston when the piston is in the first and the second positions.

20 Claims, 3 Drawing Sheets

US 7,571,708 B2

SPARK IGNITED DIRECT INJECTION TARGETING FOR IMPROVED COMBUSTION

CROSS-REFERENCE TO RELATED APPLICATIONS

This application claims the benefit of U.S. Provisional Application No. 60/971,119, filed on Sep. 10, 2007. The disclosure of the above application is incorporated herein by reference.

FIELD

The present disclosure relates to engine fuel systems, and more specifically to fuel injection targeting in spark ignited direct injection engines.

BACKGROUND

The statements in this section merely provide background information related to the present disclosure and may not constitute prior art.

Direct injection fuel systems may include the injection of fuel directly into an engine cylinder bore for combustion therein. The manner in which the fuel is injected into the cylinder may control the disbursement of the fuel within the cylinder bore. Ultimately, the fuel disbursement affects the combustion event.

SUMMARY

An engine assembly may include an engine block defining a cylinder bore, a piston disposed within the cylinder bore, and a spark ignited direct injection fuel system. The piston may be disposed within the cylinder bore and may be reciprocally displaceable from a first position to a second position during an intake stroke. The cylinder bore and the piston may partially define a combustion chamber. The spark ignited direct injection fuel system may include a fuel injector that provides a fuel flow to the combustion chamber during the intake stroke. The fuel flow may be directed toward an upper surface of the piston when the piston is in the first and the second positions.

A spark ignited direct injection fuel system may include a fuel injector that provides a fuel flow to a combustion chamber defined by a cylinder bore in an engine block. The fuel flow may be directed toward an upper surface of a piston disposed within the cylinder bore. The fuel flow may be directed toward the upper surface while the piston is displaced from a first position to a second position during an intake stroke of the piston.

A method may include providing a direct injection fuel injector in communication with a combustion chamber of an internal combustion engine defined by a cylinder bore in an engine block and a piston disposed for reciprocal displacement in the cylinder bore. The method may further include injecting a fuel flow from the fuel injector into the combustion chamber during an intake stroke of the piston when the piston is in a first position and continuing the injecting when the piston is in a second position during the intake stroke. The injecting may include directing the fuel flow in a direction toward an upper surface of the piston while the piston travels from the first to the second position.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
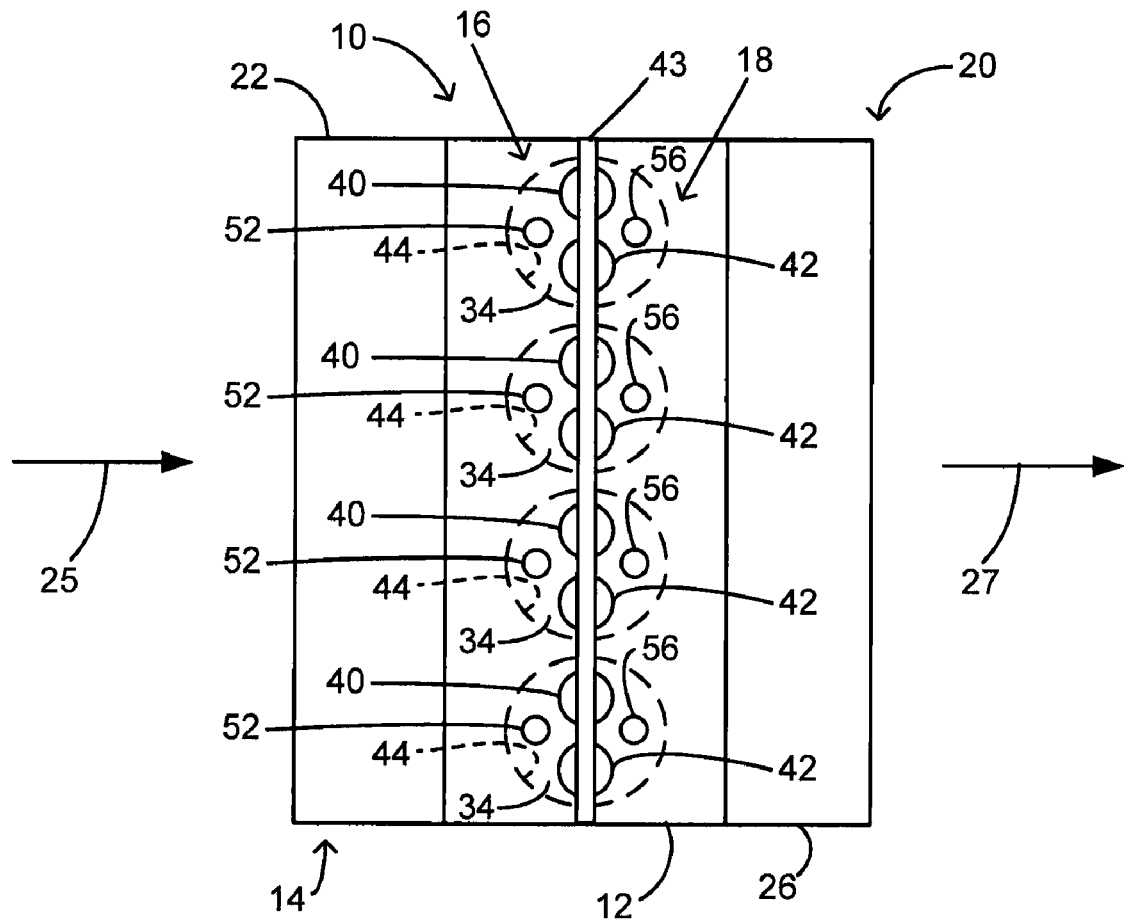
FIG. 1 is a schematic illustration of an engine assembly according to the present disclosure.

The following description is merely exemplary in nature and is not intended to limit the present disclosure, application, or uses. It should be understood that throughout the drawings, corresponding reference numerals indicate like or corresponding parts and features.

Referring now to FIG. 1, an exemplary engine assembly 10 is schematically illustrated. Engine assembly 10 may include an engine 12 in communication with an intake system 14, a fuel system 16, an ignition system 18, and an exhaust system 20. Intake system 14 may include an intake manifold 22 that provides an airflow (indicated by arrow 25) into engine 12. Fuel system 16 may control a fuel flow into engine 12 and ignition system 18 may ignite the air/fuel mixture provided to engine 12 by intake system 14 and fuel system 16. Exhaust system 20 may include an exhaust manifold 26 in communication with an exhaust gas (indicated by arrow 27) generated from ignition of the air/fuel mixture. While engine 12 is illustrated as an inline four cylinder engine, it is understood that the arrangement of engine 12 is merely exemplary and the present disclosure is applicable to a variety of engine configurations having any number of cylinders and arrangements including, but not limited to, inline and V-engines.

Figure 2:
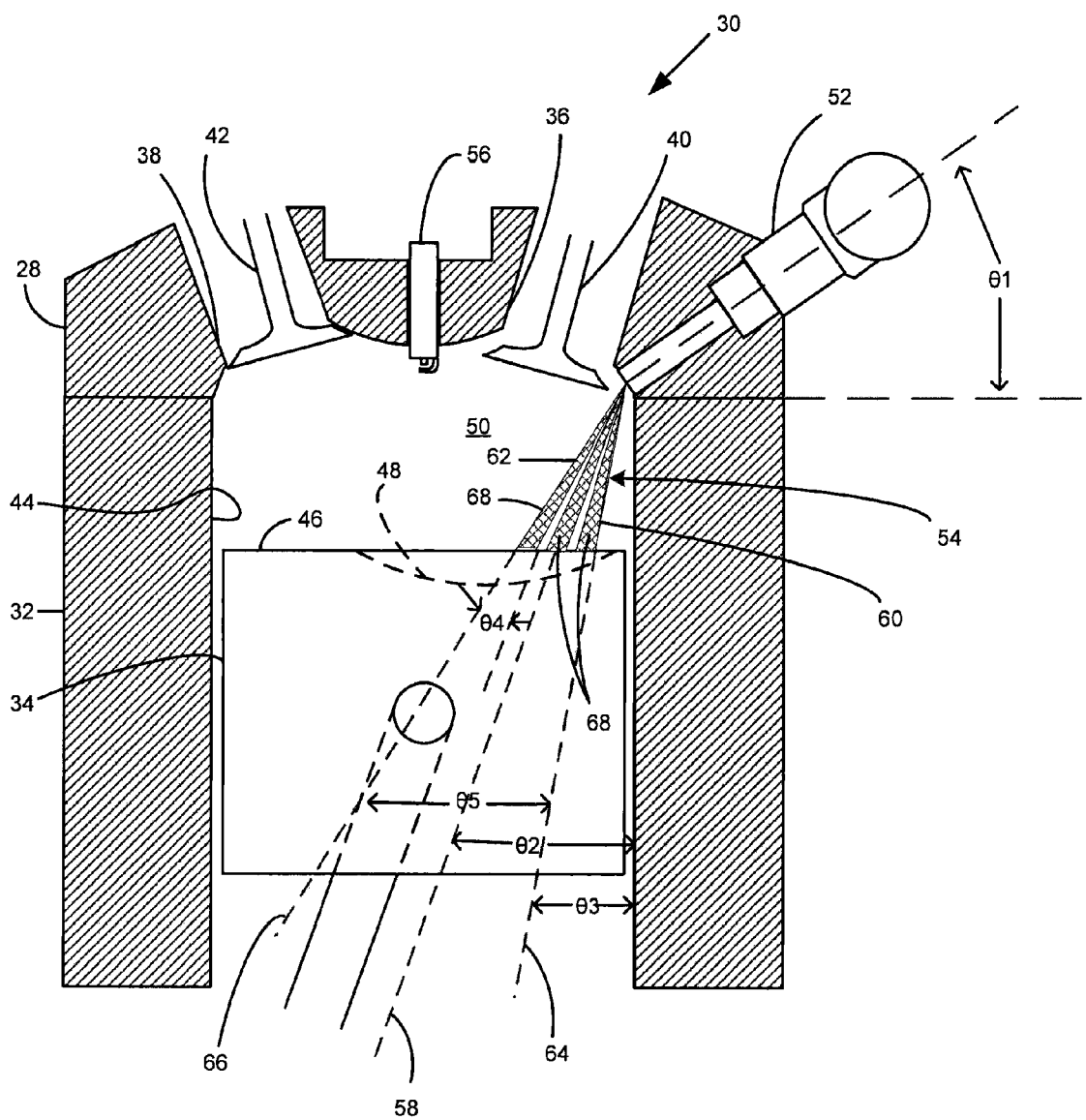
FIG. 2 is a schematic section view of the engine, fuel system, and ignition system of the engine assembly of FIG. 1.
Figure 3:
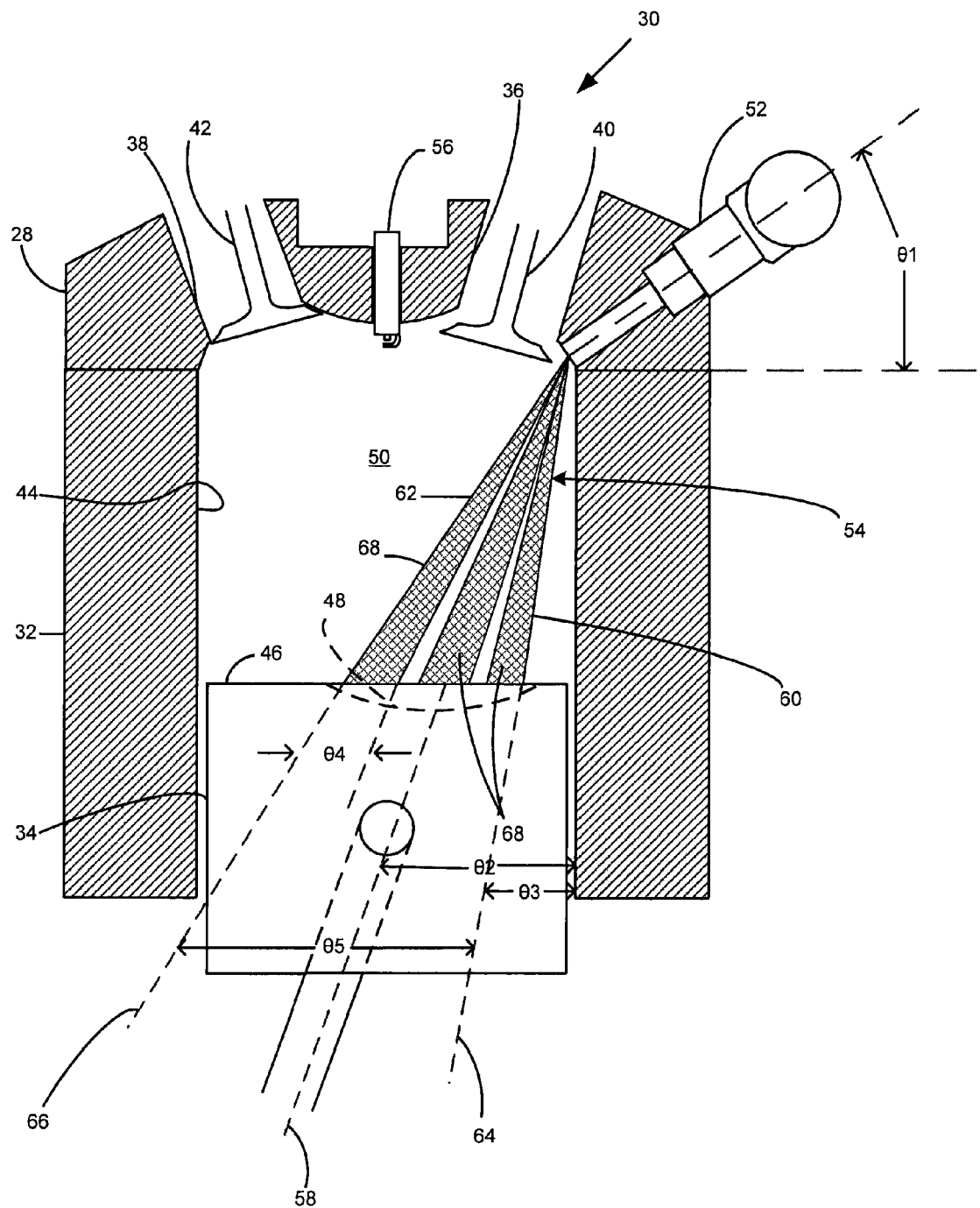
FIG. 3 is an alternate schematic section view of the engine, fuel system, and ignition system of the engine assembly of FIG. 1.

With additional reference to FIGS. 2 and 3, engine 12 may include a head 28, a valvetrain 30, a block 32, and a piston 34. Head 28 may include intake and exhaust ports 36, 38 in communication with intake and exhaust manifolds 22, 26, respectively. Valvetrain 30 may include intake and exhaust valves 40, 42. Intake valve 40 may be disposed within intake port 36 and exhaust valve 42 may be disposed within exhaust port 38. Intake and exhaust valves 40, 42 may be displaceable between open and closed positions through engagement with a camshaft 43.

Block 32 may define a cylinder bore 44 having piston 34 disposed therein. Piston 34 may include an upper surface 46 having a dish 48 defining a recess therein. Alternatively, upper surface 46 may be generally flat or may have a convex shape. Piston 34 may be disposed within cylinder bore 44 for displacement between top dead center (TDC) and bottom dead center (BDC) positions. More specifically, displacement of piston 34 may include an intake stroke, a compression stroke, a power stroke, and an exhaust stroke.

During the intake stroke, intake valve 40 may be in an open position (seen in FIGS. 2 and 3). Piston 34 may be displaceable from a first position (FIG. 2) to a second position (FIG. 3) during the intake stroke. The second position may be subsequent to the first position during the intake stroke. The first position may generally correspond to a position between TDC (start of intake stroke) and a position corresponding to 30 percent of the intake stroke. The second position may correspond to a position between 70 percent of the intake stroke and BDC (end of intake stroke).

Head 28, cylinder bore 44, and piston 34 may generally define a combustion chamber 50 for engine 12. Fuel system 16 may include a fuel injector 52 extending into and fixed to head 28. Injector 52 may be disposed at an angle θ1 relative to a plane perpendicular to cylinder bore 44. Angle θ1 may generally be between 15 and 30 degrees. For example, θ1 may be approximately 23 degrees. Injector 52 may provide a fuel flow 54 to combustion chamber 50. Ignition system 18 may include a spark plug 56 extending into combustion chamber 50 that selectively ignites the air/fuel mixture therein.

Fuel flow 54 may include a flow pattern defining a central axis 58 and an outer periphery including radially inner and outer portions 60, 62. The flow pattern of fuel flow 54 may be generally conical. Radially inner portion 60 may generally be defined at a portion of fuel flow 54 proximate a portion of cylinder bore 44 generally circumferentially aligned with injector 52. Radially outer portion 62 may be defined generally opposite radially inner portion 60.

During the intake stroke, injector 52 may begin to provide fuel flow 54 when piston 34 is in the first position (FIG. 2) and may terminate fuel injection when piston 34 is in the second position (FIG. 3). Alternatively, injector 52 may additionally continue to supply fuel beyond BDC of the intake stroke and into the compression stroke. Fuel flow 54 may be directed toward upper surface 46 when piston 34 is in the first position and when piston 34 is in the second position. More specifically, fuel flow 54 may be directed toward dish 48 when piston 34 is in the first position and when piston 34 is in the second position. Fuel flow 54 may directly impact upper surface 46 of piston 34 when piston 34 is in the first position and when piston 34 is in the second position. More specifically, fuel flow 54 may directly impact upper surface 46 during the entire intake stroke injection event.

Alternatively stated, central axis 58 may intersect upper surface 46, and more specifically dish 48, when piston 34 is in the first position and when piston 34 is in the second position. Central axis 58 may extend at an angle θ2 relative the portion of cylinder bore 44 circumferentially aligned with injector 52. Angle θ2 may generally be between 25 and 40 degrees. For example, θ2 may be approximately 33 degrees.

Additionally, axes 64, 66 extending along radially inner and outer portions 60, 62, respectively, may intersect upper surface 46, and more specifically dish 48, when piston 34 is in the first position and when piston 34 is in the second position. More specifically, axis 64 may extend at an angle of θ3 relative to the portion of cylinder bore 44 circumferentially aligned with injector 52. Angle θ3 may generally be between 5 and 25 degrees. For example, θ3 may be approximately 16 degrees. As such, during the entire intake stroke injection event, fuel flow 54 may be directed toward upper surface 46, and more specifically dish 48, and not directly toward cylinder bore 44.

Additionally, fuel flow 54 may be directed away from intake valve 40 while intake valve 40 is in the open position during the intake stroke. The outer periphery of fuel flow 54 proximate intake valve 40 may be spaced therefrom. More specifically, radially outer portion 62 may be spaced radially outwardly from intake valve 40 when intake valve 40 is in the open position. Therefore, central axis 58 may also be spaced from intake valve 40. As such, fuel flow 54 may be directed away from intake valve 40 and cylinder bore 44 and may be generally directed toward upper surface 46 of piston 34.

Fuel flow 54 may include a series of plumes 68 forming the generally conical flow pattern. Plumes 68 may each have an angular span of angle θ4 and may each include peripheries spaced apart from one another to provide an air gap therebetween. Angle θ4 may generally be less than or equal to 10 degrees, and more specifically between 5 and 10 degrees. For example, θ4 may be approximately 7 degrees. Fuel flow 54 may include an umbrella angle θ5 defining an angular span of fuel flow 54. Umbrella angle θ5 may generally be defined as the angle between radially inner and outer portions 60, 62. Umbrella angle θ5 may generally be less than or equal to 40 degrees, and more specifically between 25 and 40 degrees. For example, θ5 may be approximately 33 degrees.

The combination of angle θ2 of central axis 58 and umbrella angle θ5 may generally provide the targeting of fuel flow 54 toward upper surface 46 of piston 34. The combination of angles θ2, θ5 may also provide the spacing between fuel flow 54 and intake valve 40 during the intake stroke. The characteristics of plumes 68 may additionally contribute to the targeting and spacing discussed above.

Plumes 68 may each have a fluid velocity that is greater than the mean velocity of piston 34 during the intake stroke for a given engine speed. For example, the fluid velocity of plumes 68 may be greater than the mean velocity of piston 34 when engine 12 is operating at speeds greater than 2000 RPM, and more specifically at speeds greater than 4000 RPM.

The combination of plume angle θ4 and the fuel flow velocity associated with each plume 68 may maintain the integrity of plumes 68. Plume angle θ4 and the fuel flow velocity may inhibit diffusion of the fuel contained in each plume into the surrounding combustion chamber 50. Plumes 68 may each retain at least 50 percent of their respective injected fuel volume of fuel flow 54 up to a location within cylinder bore 44 corresponding to 50 percent of the intake stroke. More specifically, plumes 68 may retain at least 30 percent of the injected fuel volume of fuel flow 54 up to a location within cylinder bore 44 corresponding to 80 percent of the intake stroke. Retention of fuel within plumes 68 may generally include retention within plume angle θ4 for a given plume 68. Therefore, rather than having fuel flow 54 scattered within combustion chamber 50, plumes 68 may generally remain intact a distance into combustion chamber 50.

More specifically, plumes 68 may each retain at least 50 percent of the injected fuel volume of fuel flow 54 until impact occurs between upper surface 46 of piston 34 and plumes 68 when piston 34 is in a position within cylinder bore 44 corresponding to 50 percent of the intake stroke. Plumes 68 may each retain at least 30 percent of the injected fuel volume of fuel flow 54 until impact occurs between upper surface 46 of piston 34 and plumes 68 when piston 34 is in a position within cylinder bore 44 corresponding to 80 percent of the intake stroke.

Therefore, at least 50 percent of the fuel volume associated with each of plumes 68, and therefore fuel flow 54, may directly impact upper surface 46 of piston 34 when piston 34 is in a position within cylinder bore 44 corresponding to 50 percent of the intake stroke. At least 30 percent of the fuel volume associated with each of plumes 68, and therefore fuel flow 54, may directly impact upper surface 46 of piston 34 when piston 34 is in a position within cylinder bore 44 corresponding to 80 percent of the intake stroke.

Maintaining the integrity of plumes 68 may assist in targeting upper surface 46 of piston 34. Angle θ4 and the fuel flow velocity of plumes 68 may limit the amount of fuel that diffuses away from the targeted upper surface 46 of piston 34. Angle θ4 and the fuel flow velocity of plumes 68 may limit the amount of fuel that diffuses therefrom toward intake valve 40 during the intake stroke. Limiting the amount of fuel traveling toward intake valve 40 may generally limit the quantity of fuel accumulation on intake valve 40. As such, the combustion event is displaced from intake valve 40, resulting in a reduction of soot build-up on intake valve 40.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings and the specification.

What is claimed is:

1. An engine assembly comprising:
an engine block defining a cylinder bore;
a piston disposed within the cylinder bore and reciprocally displaceable from a first position during an intake stroke to a second position corresponding to a position between 70 percent and 100 percent of the intake stroke, the cylinder bore and the piston partially defining a combustion chamber; and
a spark ignited direct injection fuel system including a fuel injector that provides a fuel flow to the combustion chamber during the intake stroke directed toward an upper surface of the piston when the piston is in the first and the second positions, the entire fuel flow provided by the fuel injector defining a flow pattern having a central axis extending at an angle relative to the cylinder bore and intersecting the upper surface of the piston when the piston is in the second position, the entire fuel flow defining an outer periphery extending around the central axis, the outer periphery having a radially innermost portion circumferentially aligned with the injector relative to the cylinder bore and a radially outermost portion opposite the radially innermost portion, the radially outermost portion extending in a direction toward the piston and intersecting the upper surface of the piston when the piston is in the second position.

2. The engine assembly of claim 1, wherein the piston includes a recess in the upper surface, the central axis intersecting the recess when the piston is in the second position.

3. The engine assembly of claim 1, wherein the fuel flow continues when the piston is in the second position.

4. The engine assembly of claim 3, wherein the fuel flow begins when the piston is in the first position.

5. The engine assembly of claim 1, further comprising an intake valve selectively displaceable between open and closed positions that selectively provides air to the cylinder bore, the fuel flow being directed away from the intake valve when the intake valve is in the open position.

6. The engine assembly of claim 5, wherein the radially outermost portion of the fuel flow is spaced away from the intake valve when the intake valve is in the open position.

7. A spark ignited direct injection fuel system including a fuel injector that provides a fuel flow to a combustion chamber defined by a cylinder bore in an engine block and directed toward an upper surface of a piston disposed within the cylinder bore, the fuel flow being directed toward the upper surface while the piston is displaced from a first position during an intake stroke of the piston to a second position corresponding to a position between 70 percent and 100 percent of the intake stroke, the entire fuel flow provided by the fuel injector defining a flow pattern having a central axis extending at an angle relative to the cylinder bore and intersecting the upper surface of the piston when the piston is in the second position, the entire fuel flow defining an outer periphery extending around the central axis, the outer periphery having a radially innermost portion circumferentially aligned with the injector relative to the cylinder bore and a radially outermost portion opposite the radially innermost portion, the radially outermost portion extending in a direction toward the piston and intersecting the upper surface of the piston when the piston is in the second position.

8. The fuel system of claim 7, wherein the fuel flow continues when the piston is in the second position.

9. The fuel system of claim 8, wherein the fuel flow begins when the piston is in the first position.

10. The fuel system of claim 7, wherein the fuel flow is directed away from an intake valve extending into the combustion chamber during the intake stroke.

11. The fuel system of claim 10, wherein the radially outermost portion of the fuel flow is spaced away from the intake valve during the intake stroke.

12. A method comprising:
providing a direct injection fuel injector in communication with a combustion chamber of an internal combustion engine defined by a cylinder bore in an engine block and a piston disposed for reciprocal displacement in the cylinder bore;
injecting a fuel flow from the fuel injector into the combustion chamber during an intake stroke of the piston when the piston is in a first position; and
continuing the injecting when the piston is in a second position during the intake stroke corresponding to a position between 70 percent and 100 percent of the intake stroke, the injecting including directing the fuel flow in a direction toward an upper surface of the piston while the piston travels from the first to the second position, the entire fuel flow provided by the fuel injector defining a flow pattern having a central axis extending at an angle relative to the cylinder bore and intersecting the upper surface of the piston when the piston is in the second position, the entire fuel flow defining an outer periphery extending around the central axis, the outer periphery having a radially innermost portion circumferentially aligned with the injector relative to the cylinder bore and a radially outermost portion opposite the radially innermost portion, the radially outermost portion extending in a direction toward the piston and intersecting the upper surface of the piston when the piston is in the second position.

13. The method of claim 12, wherein the injecting includes directing the fuel flow in a direction toward a recess in the upper surface when the piston is in the second position.

14. The method of claim 12, wherein the injecting includes directing the radially outermost portion of the fuel flow away from an intake valve when the intake valve is in an open position during the intake stroke.

15. The engine assembly of claim 1, wherein an angle defined between the radially innermost and radially outermost portions of the flow pattern is less than or equal to 40 degrees.

16. The engine assembly of claim 15, wherein the fuel flow includes multiple plumes located between the radially innermost and radially outermost portions and spaced from one another.

17. The fuel system of claim 7, wherein an angle defined between the radially innermost and radially outermost portions of the flow pattern is less than or equal to 40 degrees.

18. The fuel system of claim 17, wherein the fuel flow includes multiple plumes located between the radially innermost and radially outermost portions and spaced from one another.

19. The method of claim 12, wherein an angle defined between the radially innermost and radially outermost portions of the flow pattern is less than or equal to 40 degrees.

20. The method of claim 19, wherein the fuel flow includes multiple plumes located between the radially innermost and radially outermost portions and spaced from one another.

* * * * *